STABILIZATION OF POLYALDEHYDES WITH QUINOLINE COMPOUNDS

Eli Perry, Galveston, Tex., assignor to Monsanto Company, a corporation of Delaware
No Drawing. Filed Sept. 20, 1962, Ser. No. 225,144
5 Claims. (Cl. 260—45.8)

The present invention relates to high polymers of aldehydes and more particularly to stabilization of such polymers.

It is known that aldehydes such as acetaldehyde, propionaldehyde, acrolein, methacrolein and substituted methacroleins, and the like can be polymerized to yield acetal-type polymers of high molecular weight having molecular chains consisting of a succession of alternate carbon atoms and oxygen atoms as represented by the structural formula

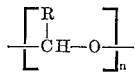

wherein R is an unsubstituted or a substituted hydrocarbon radical. The utility of these polymers, however, is seriously limited by reason of their instability. The polymers are readily subject to degradation via several different mechanisms: thermal depolymerization initiated at the ends of the polymer molecules; thermal decomposition at elevated temperatures with reformation of the monomeric aldehyde; oxidative attack by oxygen or free radicals having an oxidative tendency; and acid cleavage often brought about by residual traces of the acid catalyst employed in the preparation of the polymer.

Stabilization of the polyaldehydes can be effected by reacting the polymers to tie up the end groups. For example, the polymers can be esterified by reacting them with carboxylic acid anhydrides, preferably acetic anhydride, in the presence of acid-binding substances. These processes, however, are complicated and expensive. Another method of protecting polymeric materials against attack is by the addition of organic compounds as stabilizers. In practice, however, it has been hard to achieve stabilization of polyaldehydes by this method although certain classes of organic compounds have been found to be effective with formaldehyde polymers, i.e., polyoxymethylene compounds. Consequently, it is an object of the present invention to provide a novel class of stabilizers which can be incorporated into polyaldehydes and thereby produce compositions which are more stable that the polyaldehydes alone and consequently more useful.

It is a more particular object of the invention to provide novel polyaldehyde compositions which are stabilized against the degradative effects of heat.

These and other objects and advantages of the invention which will become apparent from the following description thereof are accomplished by incorporating in or intimately admixing with the polyaldehydes a minor amount of a quinoline compound. Compositions comprising a polyaldehyde and a minor amount of quinoline, 1,2-dihydroquinoline or a derivative of these compounds exhibit a high degree of resistance to degradation or deterioration when subjected to elevated temperatures.

The quinoline compounds employed as stabilizers in this invention are those conforming to the following generic formulas:

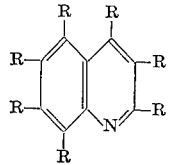 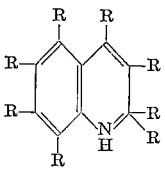

wherein R can be the same or different and is selected from the group consisting of hydrogen, the halogens, hydroxy, amino and nitro radicals, and alkyl, alkenyl, alkoxy and aryl radicals having up to 16 carbon atoms. Examples of suitable compounds falling within these general formulas are quinoline,
2-methylquinoline,
4-ethylquinoline,
6-propylquinoline,
7-butylquinoline,
8-dodecylquinoline,
2,3-dimethylquinoline,
4,7-diethylquinoline,
4,8-dipropylquinoline,
5,8-dioctylquinoline,
2,3,8-trimethylquinoline,
2,4,8-triethylquinoline, and the like;
2-vinylquinoline,
8-ethyl-2-vinylquinoline,
4-hexyl-5-vinylquinoline,
2,5,8-trivinylquinoline,
6,7-dimethyl-2,3-divinylquinoline, and the like;
2-methoxyquinoline,
2-methyl-4-methoxyquinoline,
8-ethyl-2-ethoxyquinoline,
2,4-dimethyl-6-butoxyquinoline, and the like;
2-hydroxyquinoline,
4-hydroxyquinoline,
8-hydroxyquinoline,
2-hydroxy-4,7-dimethylquinoline,
6-methyl-2-phenyl-4-hydroxyquinoline, and the like;
2-chloroquinoline,
4-chloroquinoline,
4,7-dichloroquinoline,
2-chloro-4-hydroxyquinoline,
4,7-dibromo-2,8-dimethylquinoline, and the like;
2,4-dimethyl-6-phenylquinoline,
2,4-diethoxy-8-phenylquinoline,
4-tolylquinoline,
2,4,8-trimethyl-6-xylylquinoline, and the like;
2-aminoquinoline,
2-amino-3,4-diethylquinoline,
6-nitro-4,7-dimethylquinoline, and the like;
1,2-dihydroquinoline,
6-chloro-1,2-dihydroquinoline,
2,4-dibromo-1,2-dihydroquinoline,
2-phenyl-4-chloro-1,2-dihydroquinoline,
4-methoxy-1,2-dihydroquinoline,
5-hydroxy-1,2-dihydroquinoline,
4-ethyl-1,2-dihydroquinoline,
6-phenyl-2,4-dimethyl-1,2-dihydroquinoline,
6-amino-1,2-dihydroquinoline,
4-vinyl-1,2-dihydroquinoline,
5-ethoxy-4-propyl-1,2-dihydroquinoline,
3-nitro-5-methyl-1,2-dihydroquinoline, and the like.
Particularly preferred are
2,2,4-trialkyl-6-substituted-1,2-dihydroquinolines such as
2,2,4-trimethyl-6-ethoxy-1,2-dihydroquinoline,
2,2,4-trimethyl-6-dodecyl-1,2-dihydroquinoline,
2,2,4-trimethyl-6-methoxy-1,2-dihydroquinoline,
2,2,4-trimethyl-6-butoxy-1,2-dihydroquinoline,
2,2,4-triethyl-6-octoxy-1,2-dihydroquinoline,
2,2-dimethyl-4-ethyl-6-undecoxy-1,2-dihydroquinoline,
2,2-dimethyl-4-ethyl-6-propyl-1,2-dihydroquinoline,
2,2,4-trimethyl-6-heptyl-1,2-dihydroquinoline,
2,2,4-triethyl-6-undecyl-1,2-dihydroquinoline,
2,2,4-trimethyl-6-tolyl-1,2-dihydroquinoline,
2,2,4-trimethyl-6-xylyl-1,2-dihydroquinoline,
2,2,4-trimethyl-6-octyl-1,2-dihydroquinoline,
2,2,4-trimethyl-6-dihexylphenyl-1,2-dihydroquinoline, 2,2,4-trimethyl-6-tributylphenyl-1,2-dihydroquinoline,
2,2-dimethyl-4-ethyl-6-phenoxy-1,2-dihydroquinoline,
2,2,4-trimethyl-6-dimethylphenoxy-1,2-dihydroquinoline,
2,2,4-trimethyl-6-diisopropylphenoxy-1,2-dihydroquinoline,
2,2,4-trimethyl-6-isopropylphenyl-1,2-dihydroquinoline,
2,2-dimethyl-4-ethyl-6-diisopropylphenoxy-1,2-dihydroquinoline,
2,2-dimethyl-4-ethyl-6-isopropylphenyl-1,2-dihydroquinoline,
2,2,4-trimethyl-6-butyl-1,2-dihydroquinoline, and the like.

The amount of stabilizer used can be varied widely depending upon the particular polyaldehyde to be stabilized and the degree of stabilization desired. Generally, amounts from as little as 0.01% by weight to as much as 20 to 25% by weight of the polymer can be employed. For most practical purposes, amounts from about 0.01% to about 15% are satisfactory with amounts from about 3% to about 6% being preferred.

The stabilizer compounds can be incorporated in the polymer in any of several ways. Generally, they are added by intimately admixing a solution of the stabilizer in a volatile solvent with the finely divided polymer and thereafter evaporating the solvent, preferably under reduced pressure. As an alternative method, both the polymer and the stabilizer can be dissolved in a common solvent and the solvent then evaporated. Or, a mutual solution of the stabilizer and the polyaldehyde can be made and the polymer then precipitated from the solution by addition of water or some other non-solvent for the resin and stabilizer. Also, the admixture may be effected by dry blending of the stabilizer and the polymer on mill rolls. In still another method, the stabilizer can be added to the polymerization system before or after the polymer has formed but before isolation of the polymer.

The polyaldehydes which can be thermally stabilized according to the invention with a quinoline compound include all those obtained by polymerization of aldehydes of the formula R—CHO wherein R can be an alkyl, a cycloalkyl, an alkenyl, an alkynyl, an aryl, an aralkyl, or an alkaryl radical. The stabilizers are particularly useful with polyldehydes derived from saturated aliphatic aldehydes containing from 2 to 10 carbon atoms and more especially from 2 to 7 carbon atoms. Specific examples of suitable aldehyde monomers include acetaldehyde, propionaldehyde, butyraldehyde, valeraldehyde, heptaldehyde, and the like; acrolein, methacrolein, substituted methacroleins such as tiglic aldehyde, crotonaldehyde, and the like; propargyl aldehyde; benzaldehyde, p-tolualdehyde, p-isopropylbenzaldehyde, cinnamaldehyde, phenylacetaldehyde, and the like. Other polyaldehydes with which the stabilizers are useful include those derived from dialdehydes such as glyoxaldehyde, succinaldehyde, malealdehyde, glutaraldehyde, and the like; substituted aldehydes such as chloral, aldol, and the like; and heterocyclic aldehydes such as furfural and tetrahydrofurfural. The stabilizers of the invention are likewise useful with copolymers prepared by copolymerizing the foregoing aldehydes with each other and/or with oxy-aldehydes, ether-aldehydes, amino-aldehydes and halogenated aldehydes or with other polymerizable vinyl monomers, epoxides, ketones, and the like.

The compositions of the invention may also include, if desired, plasticizers, fillers, pigments, anti-oxidants and other stabilizers such as stabilizers against degradation caused by ultraviolet light.

The following example is presented to illustrate the invention but is not to be construed as limiting it in any manner whatsoever. The property of thermal stability which is used in evaluating the effect of the polyaldehyde stabilizers is defined by the value of the reaction rate constant for the thermal degradation of the polymer at a particular elevated temperature, namely, 190° C. It is well known that chemical reactions may be classed as first order, second order, third order, etc., depending on the number of molecules which enter into or are formed by the reaction. It is also known that the decomposition or degradation of a material following a first order reaction can be expressed mathematically in the form of the differential equation:

$$-\frac{dw}{dt}=kw$$

in which $t$ is the elapsed time from the beginning of the decomposition reaction, $w$ is the weight of the material which remains undecomposed at time $t$, and $k$ is a rate constant for the equation. The thermal degradation of the polyaldehyde polymers of this invention has been found to conform generally to a first order reaction which can be expressed by the above equation. The value of $k$ in this equation, therefore, is utilized to characterize the polymers with respect to thermal stability. The lower the numerical value obtained for this constant, the more stable is the polymer.

*Example*

Polypropionaldehyde was prepared by polymerizing propionaldehyde at a temperature of −76° C. in n-hexane as the reaction medium and in the presence of about 9.8% by weight (based on propionaldehyde) of triethylaluminum as catalyst. A portion of the polymer was then stabilized with 2,2,4 - trimethyl - 6 - dodecyl-1,2-dihydroquinoline and subjected to a stabilization test. The procedure for stabilizing and testing was as follows:

A weighed portion of the polymer was placed in a tared 25-cc. Erlenmeyer flask. Toluene (1 cc.) was added to the flask and the polymer was allowed to swell for about 3 hours. A solution of 2,2,4-trimethyl-6-dodecyl-1,2-dihydroquinoline in toluene of a concentration such as to yield upon drying 6.0% by weight of the stabilizer was then added and the polymer was allowed to soak therein for about 3 hours. At the end of this time, the solvent was evaporated at 25° C. under vacuum. The flask was then purged for about five minutes with argon at a rate of about 250 cc. per minute. The argon flow was reduced to about 5–10 cc. per minute and the flask was immersed in an oil bath maintained at 190±1° C. for five minutes while the argon purge was maintained at the slow rate. At the end of this time, the flask was removed from the bath, cooled under argon and weighed to determine any loss in weight. From the weight loss, the percent residue was determined. The first order rate constant, $k$, was calculated from the data obtained.

For comparative purposes, a sample of polymer containing no stabilizer was subjected under an argon atmosphere to the elevated temperature of the oil bath along with the stabilized samples and the $k$ value of its thermal degradation was determined in the same manner.

Also, for comparison, $k$ values of a control sample and a sample containing 6% by weight of 2,2,4-trimethyl-6-dodecyl-1,2-dihydroquinoline were determined in air, i.e., no argon purge was employed in the stabilization test. Results of these tests tabulated below demonstrate that the polyaldehyde compositions of the invention are outstanding in their resistance to degradation at elevated temperatures.

| Amount of 2,2,4-trimethyl-6-dodecyl-1,2-dihydroquinoline Stabilizer (Percent by Wt.) | $k_{190°}$ | |
|---|---|---|
| | Argon | Air |
| None | 0.56 | 0.77 |
| 6.0 | 0.09 | 0.20 |

What is claimed is:

1. A thermally-stabilized polymeric composition comprising a polyaldehyde and from about 0.01 to about 15% by weight of said polyaldehyde of a quinoline compound chosen from the group consisting of compounds having the generic formula

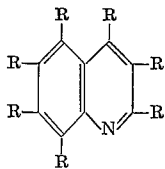

and compounds having the generic formula

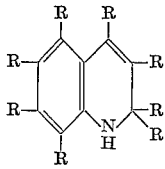

wherein R in said formulas is selected from the group consisting of hydrogen, the halogens, hydroxy, amino and nitro radicals, and alkyl, akenyl, alkoxy, and aryl radicals having up to 16 carbon atoms.

2. A thermally-stabilized polymeric composition comprising a polyaldehyde and from about 0.01% to about 15% by weight of said polyaldehyde of a 2,2,4-trialkyl-6-substituted-1,2-dihydroquinoline.

3. A thermally-stabilized polymeric composition comprising a high polymer of an aliphatic saturated aldehyde having from 2 to 10 carbon atoms and from about 0.01% to about 15% by weight of said polymer of 2,2,4-trimethyl-6-dodecyl-1,2-dihydroquinoline.

4. A thermally-stabilized polymeric composition comprising polypropionaldehyde and from about 0.01% to about 15% by weight of said polypropionaldehyde of 2,2,4 - trimethyl - 6 - dodecyl - 1,2-dihydroquinoline.

5. The composition of claim 4 wherein the amount of said 2,2,4 - trimethyl-6-dodecyl-1,2-dihydroquinoline is from about 3% to about 6% by weight of said polypropionaldehyde.

References Cited by the Examiner

UNITED STATES PATENTS

| | | | |
|---|---|---|---|
| 2,136,788 | 11/1938 | Fairlie | 260—45.8 |
| 2,376,354 | 3/1945 | Gresham | 260—2 |
| 2,805,212 | 9/1957 | Beaver | 260—45.8 |
| 2,955,100 | 10/1960 | Hill et al. | 260—45.8 |
| 3,025,269 | 3/1962 | Calfee | 260—45.9 |
| 3,060,149 | 10/1962 | Coran | 260—45.8 |
| 3,079,366 | 2/1963 | Boyle et al. | 260—45.9 |
| 3,083,180 | 3/1963 | Alt et al. | 260—45.8 |
| 3,131,165 | 4/1964 | Hermann et al. | 26°—45.9 |

FOREIGN PATENTS

| | | |
|---|---|---|
| 587,248 | 11/1959 | Canada. |
| 108,095 | 7/1958 | Pakistan. |

OTHER REFERENCES

Furukawa et al.: Polymerization of Aldehydes and Oxides, Interscience Publishers (1963), pages 4, 238–241 relied on. (Copy available in Scientific Library), QD 281. P6F8.

LEON J. BERCOVITZ, *Primary Examiner.*

F. M. McKELVEY, *Assistant Examiner.*